United States Patent
Goenka et al.

(10) Patent No.: US 12,309,108 B2
(45) Date of Patent: May 20, 2025

(54) METHOD AND SYSTEM FOR SUPPLEMENTING MESSAGES WITH CONTEXTUAL CONTENT

(71) Applicant: YAHOO ASSETS LLC, Dulles, VA (US)

(72) Inventors: Mohit Goenka, Santa Clara, CA (US); Nikita Varma, Milpitas, CA (US); Ashish Khushal Dharamshi, Sunnyvale, CA (US); Gnanavel Shanmugam, San Jose, CA (US)

(73) Assignee: YAHOO ASSETS LLC, New York, NY (US)

( * ) Notice: Subject to any disclaimer, the term of this patent is extended or adjusted under 35 U.S.C. 154(b) by 60 days.

(21) Appl. No.: 17/818,766

(22) Filed: Aug. 10, 2022

(65) Prior Publication Data
US 2024/0056406 A1 Feb. 15, 2024

(51) Int. Cl.
G06F 17/00 (2019.01)
G06F 40/169 (2020.01)
G06N 3/08 (2023.01)
H04L 51/07 (2022.01)

(52) U.S. Cl.
CPC ............ H04L 51/07 (2022.05); G06F 40/169 (2020.01); G06N 3/08 (2013.01)

(58) Field of Classification Search
CPC ....... H04L 51/07; H04L 51/216; H04L 51/02; G06F 40/169; G06F 40/186; G06F 40/134; G06N 3/08
USPC .......................................................... 715/204
See application file for complete search history.

(56) References Cited

U.S. PATENT DOCUMENTS

| | | | |
|---|---|---|---|
| 7,185,065 B1 * | 2/2007 | Holtzman | G06Q 40/06 709/217 |
| 9,223,590 B2 * | 12/2015 | Moore | G06F 9/45512 |
| 9,300,611 B2 * | 3/2016 | Mody | H04L 51/08 |
| 9,390,396 B2 * | 7/2016 | Davis | G06Q 10/10 |
| 9,721,234 B2 * | 8/2017 | Vanden Heuvel | G06F 3/04842 |
| 9,794,208 B2 * | 10/2017 | Shmarovoz | H04L 51/046 |
| 10,587,745 B2 * | 3/2020 | Kim | G06Q 10/107 |
| 11,290,406 B1 * | 3/2022 | Singh | H04L 51/216 |
| 11,321,736 B2 * | 5/2022 | Lagi | G06N 20/00 |
| 11,586,878 B1 * | 2/2023 | Delany | H04L 51/00 |

(Continued)

FOREIGN PATENT DOCUMENTS

CN 115443459 A * 12/2022 ............ G06F 16/353

OTHER PUBLICATIONS

"Action;" Mar. 24, 2022; Merriam-Webster.com; pp. 1-9.*

(Continued)

*Primary Examiner* — Laurie A Ries
(74) *Attorney, Agent, or Firm* — James J. DeCarlo; Greenberg Traurig, LLP

(57) ABSTRACT

The application relates to a method for supplementing messages with contextual content. A processor can receive a message from a sender to a user that includes a content item. The processor can then predict a next action of the user based on the message by inputting the content item into a predictive model trained using historical actions performed by the user. Based on the output of the model, the processor can generate an augmented content item and embed the augmented content item and the content item into a user interface which is then transmitted to a client device of the user.

17 Claims, 6 Drawing Sheets

(56) References Cited

U.S. PATENT DOCUMENTS

| | | | | |
|---|---|---|---|---|
| 11,606,326 | B2* | 3/2023 | Sharp | H04L 51/212 |
| 2006/0143071 | A1* | 6/2006 | Hofmann | G06Q 30/02 |
| | | | | 705/7.34 |
| 2018/0302356 | A1* | 10/2018 | Mestanogullari | G06Q 10/107 |
| 2019/0349619 | A1* | 11/2019 | Hou | H04N 21/2407 |
| 2020/0065857 | A1* | 2/2020 | Lagi | G06Q 30/0254 |
| 2020/0153771 | A1* | 5/2020 | Thies | H04L 51/18 |
| 2020/0327378 | A1* | 10/2020 | Smith | G06F 40/30 |
| 2020/0380199 | A1* | 12/2020 | Judovsky | H04L 51/04 |
| 2021/0201144 | A1* | 7/2021 | Jonnalagadda | G06N 3/08 |
| 2021/0304027 | A1* | 9/2021 | Damodaran | G06N 3/08 |
| 2022/0036302 | A1* | 2/2022 | Cella | G06N 3/047 |
| 2023/0004260 | A1* | 1/2023 | Kotsopoulos | G06F 40/295 |
| 2023/0020218 | A1* | 1/2023 | Berger | G06V 40/161 |
| 2023/0023635 | A1* | 1/2023 | Shelton, IV | G06N 20/00 |
| 2023/0289560 | A1* | 9/2023 | Li | G06Q 30/0201 |
| 2023/0289775 | A1* | 9/2023 | Ma | G06Q 20/3255 |
| 2023/0376744 | A1* | 11/2023 | Zhou | G06Q 10/10 |
| 2024/0267348 | A1* | 8/2024 | Homsany | H04L 51/08 |
| 2024/0296939 | A1* | 9/2024 | Diwan | G16H 10/40 |

OTHER PUBLICATIONS

"data structure;" Microsoft Computer Dictionary; May 2002; Microsoft Press; Fifth Edition; p. 145.*
"template;" Jul. 7, 2022; Dictionary.com; pp. 1-5.*

* cited by examiner

METHOD AND SYSTEM FOR SUPPLEMENTING MESSAGES WITH CONTEXTUAL CONTENT

BACKGROUND

Many network services (e.g., email, instant messaging, social media) transmit messaging content for display on user devices. Originally, such content was provided as-is without any type of augmentation. Recently, some providers have extracted keywords from such messaging content to display targeted content to users. Similarly, some providers have performed bulk analyses on messaging content to provide value-added content through the engagement cycle of a user with a service. Such techniques generally do not provide relevant "next action" content to users but are merely used to provide generally relevant content to users.

DETAILED DESCRIPTION

Figure 1:
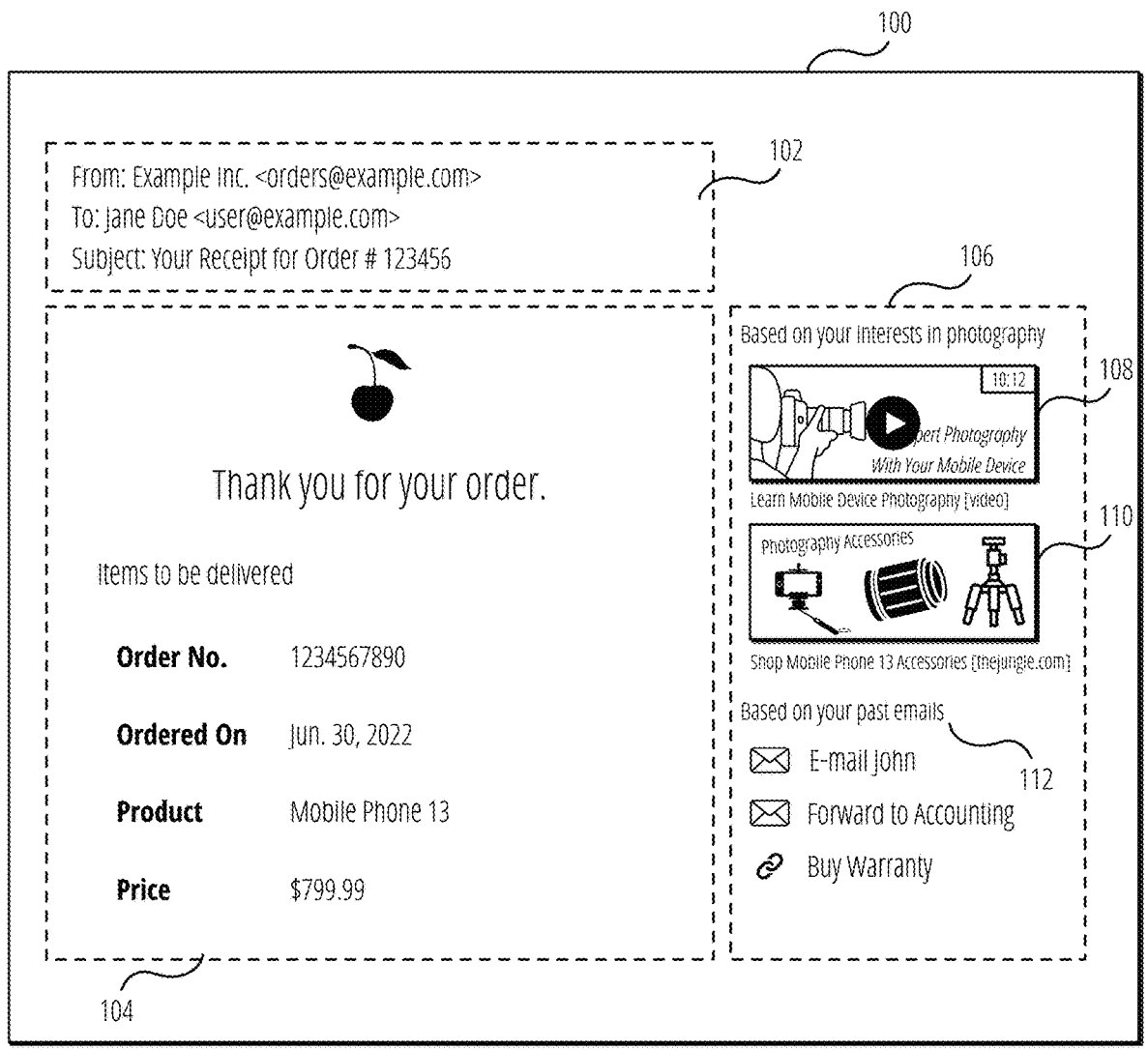
FIG. 1 is a block diagram of a message display interface (MDI) for displaying augmented content items.

The disclosure solves these and other problems in the art of computerized messaging systems by providing a per-user persona model that can predict the next action a user will take after interacting with a given message. The system feeds messages into the persona model and receives a predicted action (e.g., a type of action and parameters describing the action). The system can then generate an augmented content item with this predicted action. Finally, the system embeds the augmented content item in a message display interface presented to the user. Specific implementation details of the above concepts are provided in more detail herein.

In some aspects, the techniques described herein relate to a method including: receiving, at a processor, a message from a sender to a user, the message including a content item; predicting, by a processor, a next action of the user based on the message by inputting the content item into a predictive model trained using historical actions performed by the user; generating, by the processor, an augmented content item, the augmented content item generated based on the next action; embedding, by the processor, the augmented content item and the content item into a user interface (UI); and transmitting, by the processor, the UI to a client device of the user.

In some aspects, the techniques described herein relate to a method, wherein receiving a message from a sender to a user includes receiving an email from the sender and wherein the content item includes one of text, image, or video content.

In some aspects, the techniques described herein relate to a method, wherein predicting a next action of the user based on the message by inputting the content item into a predictive model includes inputting the content item into a neural network.

In some aspects, the techniques described herein relate to a method, further including training the neural network by generating a training dataset for the user, the training dataset generated using historical messages and historical actions performed within a forecast window relative to the historical messages.

In some aspects, the techniques described herein relate to a method, wherein the neural network outputs an action type and one or more parameters associated with the action type as the next action.

In some aspects, the techniques described herein relate to a method, wherein generating the augmented content item includes identifying an external data source and generating an embedded module displaying data from the external data source.

In some aspects, the techniques described herein relate to a method, wherein the embedded module includes an accelerated mobile pages (AMP) module.

In some aspects, the techniques described herein relate to a method, wherein embedding the augmented content item and the content item into a UI includes displaying the content item in a first pane of the UI and displaying the augmented content item alongside the first pane.

In some aspects, the techniques described herein relate to a method, wherein the augmented content item includes one of a hyperlink, video, image, or text.

In some aspects, the techniques described herein relate to a non-transitory computer-readable storage medium for tangibly storing computer program instructions capable of being executed by a computer processor, the computer program instructions defining steps of: receiving a message from a sender to a user, the message including a content item; predicting a next action of the user based on the message by inputting the content item into a predictive model trained using historical actions performed by the user; generating an augmented content item, the augmented content item generated based on the next action; embedding the augmented content item and the content item into a user interface (UI); and transmitting the UI to a client device of the user.

In some aspects, the techniques described herein relate to a non-transitory computer-readable storage medium, wherein predicting a next action of the user based on the message by inputting the content item into a predictive model includes inputting the content item into a neural network.

In some aspects, the techniques described herein relate to a non-transitory computer-readable storage medium, the steps further including training the neural network by generating a training dataset for the user, the training dataset generated using historical messages and historical actions performed within a forecast window relative to the historical messages.

In some aspects, the techniques described herein relate to a non-transitory computer-readable storage medium, wherein the neural network outputs an action type and one or more parameters associated with the action type as the next action.

In some aspects, the techniques described herein relate to a non-transitory computer-readable storage medium, wherein generating the augmented content item includes identifying an external data source and generating an embedded module displaying data from the external data source.

In some aspects, the techniques described herein relate to a non-transitory computer-readable storage medium, wherein the augmented content item includes one of a hyperlink, video, image, or text.

In some aspects, the techniques described herein relate to a device including: a processor; and a storage medium for tangibly storing thereon logic for execution by the processor, the logic including instructions for: receiving a message from a sender to a user, the message including a content item; predicting a next action of the user based on the message by inputting the content item into a predictive model trained using historical actions performed by the user; generating an augmented content item, the augmented content item generated based on the next action; embedding the augmented content item and the content item into a user interface (UI); and transmitting the UI to a client device of the user.

In some aspects, the techniques described herein relate to a device, wherein predicting a next action of the user based on the message by inputting the content item into a predictive model includes inputting the content item into a neural network.

In some aspects, the techniques described herein relate to a device, the instructions further including training the neural network by generating a training dataset for the user, the training dataset generated using historical messages and historical actions performed within a forecast window relative to the historical messages.

In some aspects, the techniques described herein relate to a device, wherein the neural network outputs an action type and one or more parameters associated with the action type as the next action.

In some aspects, the techniques described herein relate to a device, wherein generating the augmented content item includes identifying an external data source and generating an embedded module displaying data from the external data source.

FIG. 1 is a block diagram of a message display interface (MDI) for displaying augmented content items.

The MDI 100 includes message data (also referred to as messaging content) that includes, for example, a header 102 and a body 104. The message data may take various forms, including electronic mail (email), text messages, chat messages, in-app messages, or generally any other type of computer-based message. The MDI 100 depicts a header 102 and body 104 of, for example, an email message, but the disclosure is not limited as such.

The header 102 can include various metadata fields related to the message data. As illustrated, header 102 includes a sender name ("Example Inc.") or address ("orders@example.com"), a recipient name ("Jane Doe") or address ("user@example.com"), and a subject line ("Your Receipt for Order #123456"). In other implementations, header 102 can include various other fields (e.g., send date, attachment list, etc.), and the disclosure is not limited to only those fields depicted The message data includes a body 104 portion that includes one or more content items. The content items can include text, audio, video, image content, or equivalent types of content items. For example, body 104 can be a Hypertext Markup Language (HTML) document. In body 104, a logo and various pieces of text content are depicted. As will be discussed, these content items (as well as header 102) can be input into a predictive model that can predict the next action for a user based on the message data.

In addition to message data, MDI 100 can also include augmented content 106. As illustrated, the message data (e.g., header 102 and body 104) can be displayed in a first pane of MDI 100, while augmented content 106 can be displayed in a second pane of the MDI 100. In the specifically illustrated example, the second pane that includes the augmented content 106 is displayed alongside the first pane that includes the message data. However, the disclosure is not limited to a specific type of arrangement. In some implementations, the items in augmented content 106 can be web components, such as accelerated mobile pages (AMP) modules.

The various augmented content items can take various forms. As a first example, augmented content 106 can include a video content item 108. In an implementation, video content item 108 can include a thumbnail preview which includes a frame of the video, an optional duration overlay ("10:12"), and a play button. The video content item 108 can also include a title ("Learn Mobile Device Photography") and an optional flag ("[video]") indicating the content type. In some implementations, the user can click the thumbnail preview (e.g., via the play button) and watch video content while remaining in MDI 100. For example, the playback of the video can be implemented using picture-in-picture or multi-window support of the client rendering MDI 100. In this manner, a user can continue to use MDI 100 (e.g., view other messages) while still playing back video content.

As a second example, a hyperlink content item 110 is displayed within augmented content 106. In some implementations, the hyperlink content item 110 can include a thumbnail image. In some scenarios, this thumbnail image can include a stock image, a dynamically generated image (e.g., based on the next predicted action), or a combination of a stock image base with dynamically generated text (e.g., "Photography Accessories"). Hyperlink content item 110 can also include text content such as a title ("Shop Mobile Phone 13 Accessories") and a flag indicating the destination of the hyperlink ("[thejungle.com]").

As a third example, augmented content 106 can include various text hyperlinks 112. In some implementations, these hyperlinks can eschew non-text elements (e.g., audio, image, video) to allow for more room for relevant actions. Some of these hyperlinks may be in-app actions (e.g., "E-mail John" or "Forward to Accounting"), while others may direct the user to an external destination (e.g., "Buy Warranty" via an external website).

In the foregoing examples, the items in augmented content 106 can be ranked based on their likelihood of interaction. For example, a predictive model can predict multiple types of actions, and the system can rank how likely these actions are before generating content items. Thus, in MDI 100, video content item 108 may be the most likely action, while various text hyperlinks 112 may be less likely actions. In some implementations, the type of content items (e.g., video versus hyperlink) may be used to weight such rankings to ensure that certain types of content (e.g., video) are more heavily favored. Further, each of the items in augmented content 106 can be representable in different forms. Thus, augmented content 106 can be alternatively represented as a hyperlink such as that in various text hyperlinks 112.

As will be discussed in more detail, the items in augmented content 106 are selected based on the message data. In MDI 100, body 104 includes details regarding the purchase of a mobile phone ("Mobile Phone 13"). In response to such a message, a system can predict various actions the user might take in response to viewing such a message. For example, the user may have an interest in photography and thus may be likely to view tutorials on how to use a new mobile phone for photography. Similarly, they may have historically shopped for accessories after purchasing a new mobile phone. As other examples, the user may frequently email a friend ("John") after receiving messages about technology or may forward receipts to an organization's accounting department. As yet another example, the user may frequently purchase a warranty for high-value purchases. Each of these data points can be encoded into a persona model that can be used to predict actions. As illustrated, these actions can be used to build augmented content items to allow a user to complete the next action easily.

Figure 2:
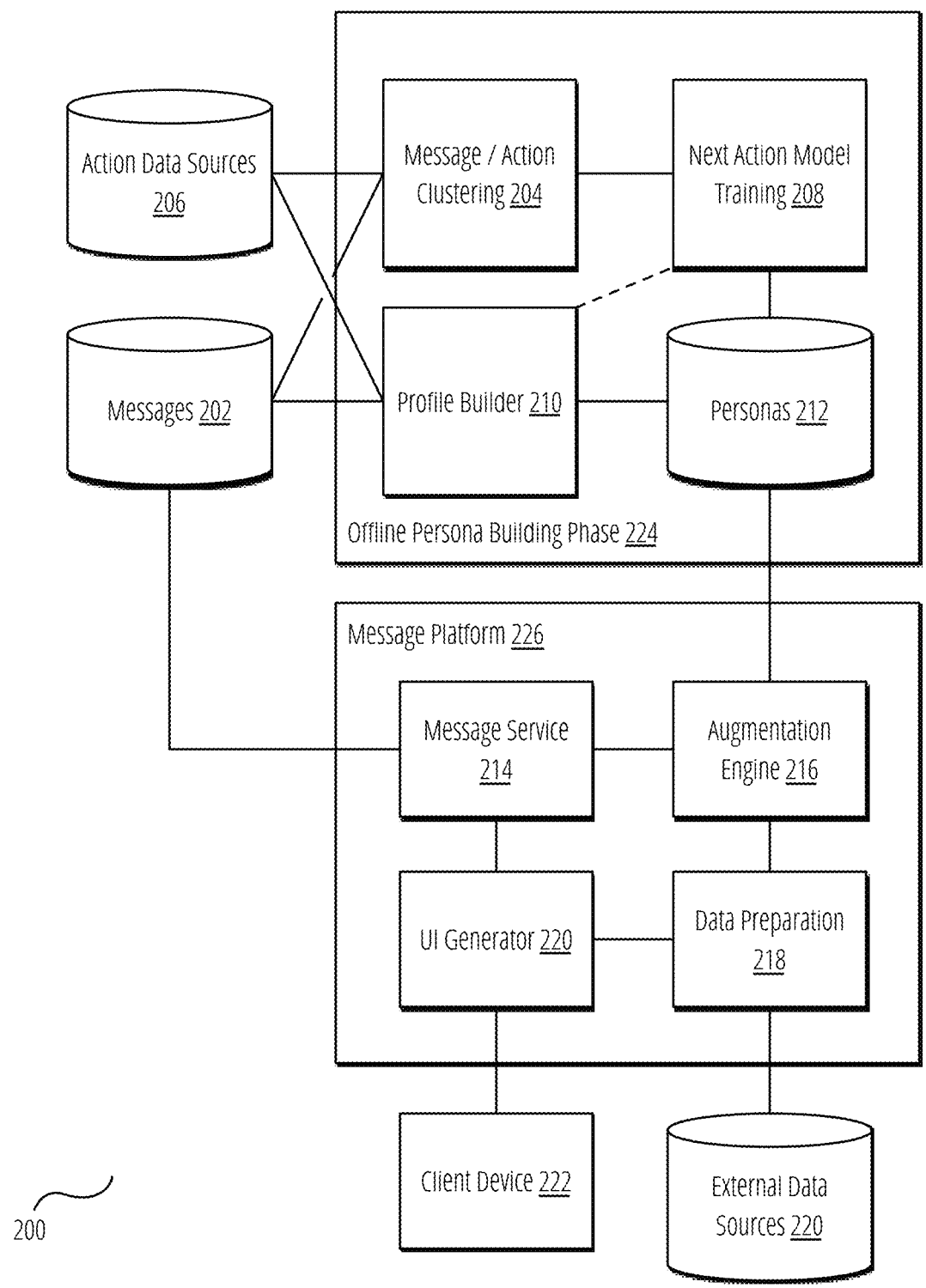
FIG. 2 is a block diagram illustrating a system for displaying augmented content items.

FIG. 2 is a block diagram illustrating a system for displaying augmented content items.

System 200 includes an offline persona building phase 224 and a message platform 226, which operate together to generate augmented content items for inclusion in a UI (such as MDI 100). Details of these components are described herein and with respect to the remaining figures.

Offline persona building phase 224 is configured to generate a persona model for any given user of system 200 and store this persona model in a database (e.g., persona database 212). In one implementation, the persona model can be stored as a neural network or a similar type of predictive model. Thus, system 200 can store weights and other parameters of the model in persona database 212 as the persona model. In some implementations, offline persona building phase 224 continuously refines, retrains, and reinforces the persona model for each user based on data generated for a given user.

In some implementations, offline persona building phase 224 retrieves data from a messages datastore 202 and action datastore 206. In some implementations, messages datastore 202 and action datastore 206 may be third-party data services. However, in other implementations, messages datastore 202 and action datastore 206 can be implemented as services offered by the same service provider that operates offline persona building phase 224 and message platform 226.

Action datastore 206 can include any type of data describing an action of a user. In general, an action can be represented as a type of action and zero or more parameters defining the action. As a first example, action datastore 206 can store the search queries of a user submitted to a search engine. In this example, the type of action can be "search," and the parameters can include, for example, the text of the query, the time of the query, etc. Further, any search results selected by the user can be represented as a "click" action for a search results page and the parameters can include details related to the website visited. As a second example, action datastore 206 can store a location history of a user. In this example, the type of action can be "location," and the parameters can include the coordinates of the user's location and a time. As a third example, action datastore 206 can store message engagement data. In this example, the type of the action can be "scroll" or "read receipt" or "click" or similar types of engagement measurements, and the parameter can include a viewed content item and a time (or similar data). The foregoing examples are not meant to be limiting and generally any type of action data can be used (as will be discussed).

Messages datastore 202 can store message data for the same users that are associated with actions in action datastore 206. As discussed above, message data can include email data, instant message data, text message data, in-chat message data, or generally any type of data representing communications between a user and another party. As with action datastore 206, messages datastore 202 can be operated independently of offline persona building phase 224 and message platform 226.

Offline persona building phase 224 includes a clustering routine 204 that reads data from messages datastore 202 and action datastore 206 and generates training data therefrom. In some implementations, the clustering routine 204 can select messages from messages datastore 202 and define a forecast window extending in the future from the date of the message (e.g., the next twenty-four hours). The clustering routine 204 can then retrieve all actions performed by the user of the message from the action datastore 206. The combination of a message and one or more actions is referred to as a message-action cluster and generally represents potential actions that are related to a given message. In one implementation, the clustering routine 204 can further generate training data based on a message and actions in a given cluster. In one implementation, the training data can have the form of a message as an input (or given variable) and each action as an output (i.e., label or predicted variable). Thus, if a user performs six actions within the forecast window after receiving a message, clustering routine 204 can generate six training examples each having the message as the input variable and the corresponding actions as labels. In some implementations, the clustering routine 204 can convert a given action into a preconfigured format such as a type and zero or more parameters.

Training stage 208 receives the training data and trains a predictive model using the training data. As discussed, the predictive model may be a neural network. In some implementations, the neural network can be an artificial neural network (ANN), deep neural network (DNN), recurrent neural network (RNN) such as a long-short term memory (LSTM) model, self-attention transformer-based model, random forest, or similar type of model. Certainly, other types of machine learning (ML) models may be used. In some implementations, a predictive model that processes time-series data (e.g., RNN or LSTM) may be used to capture temporal trends, however the disclosure is not limited as such. Indeed, in some implementations, the training data can be generated in the above manner such that each message-action pair can be analyzed independently.

Training stage 208 generally employs continuously updating the weights of the predictive model according to preconfigured hyperparameters of the predictive model. Specific details of training a predictive model are not limiting and are not disclosed in detail herein. The resulting output of training stage 208 is a set of weights or other types of parameters that represent the final state of the predictive model after training. The training stage 208 can write these weights or parameters to persona database 212 for later usage by message platform 226.

Offline persona building phase 224 also includes a profile builder 210. Profile builder 210 may also receive message and action data from messages datastore 202 and action datastore 206, respectively. In general, profile builder 210 can analyze actions and messages to build a profile for a user. Such a profile can represent the interests, likes, and dislikes of a user. In some implementations, the profile builder 210 may be implemented by counting the occurrences of known categories of data. For instance, a user that frequently receives email regarding photography and performs search queries for photography-related concepts can be associated with a profile that lists photography as a primary interest. In some implementations, the profile can include multiple types of categories or other types of demographic data. In some implementations, this data can be weighted or ranked based on how confident the profile is regarding each item.

In some implementations, profiles can be stored separate from the persona models in persona database 212. In such implementations, the profiles can be queried in response to message content to determine a user's preferences and generate augmented content items based on the user's profile. Such an implementation may be useful when a user has a limited set of actions. Alternatively, or in conjunction with the foregoing, profile data can be used during the training process performed by training stage 208. For example, profile data of the user can be added to each training vector (as input) along with message data to form a training dataset. Inclusion of profile data in the training data may aid classification as the predictive model will thus consider the user's profile when adjusting weights of the network.

While the foregoing description has emphasized the use of per-user persona models, offline persona building phase 224 may also generate a predictive model for multiple users. In general, the same processes described above may be used, however the training data would be selected across multiple users (potentially all users). In this manner, offline persona building phase 224 can generate a global (or close to global) user model that models all actions recorded by the system. Such a global model may also be useful for new users or users with limited actions undertaken. In some implementations, such a global model may be trained first and then re-trained using individual user data to fine tune the global model.

Figure 5:
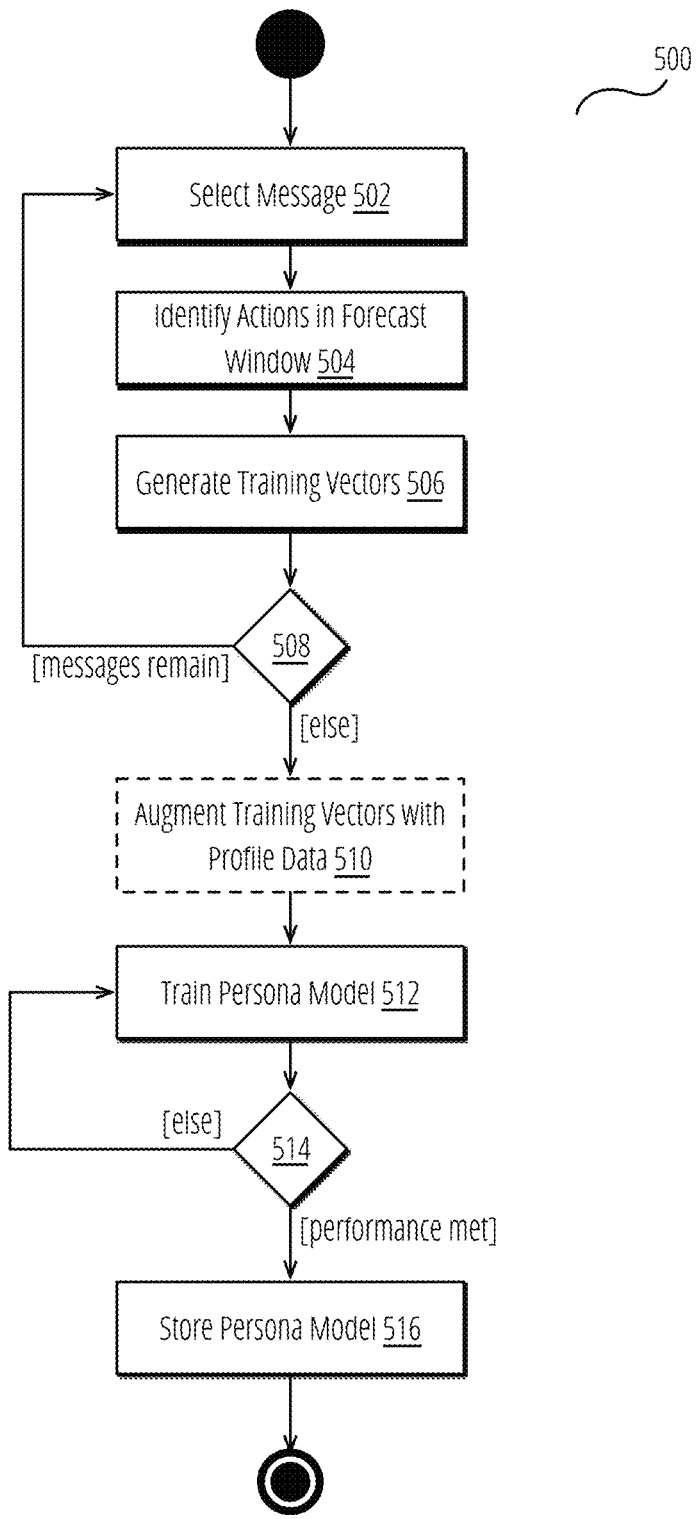
FIG. 5 is a flow diagram illustrating a method for building a persona model.

Further details regarding building persona models are described more fully in the description of FIG. 5 and are not repeated herein.

Message platform 226 accesses the persona models and profiles from offline persona building phase 224 to generate augmented content items for individual messages. As illustrated, message platform 226 includes a message service 214. Message service 214 may include various hardware or software components to provide a messaging service (e.g., email service). The specific functions of providing such a messaging service are not limiting and not necessary to explain aspects of the disclosure and, as such, are not provided. In general, profile builder 210 receives messages (e.g., from messages datastore 202) and can operate on one or more messages.

Profile builder 210 transmits messages to an augmentation engine 216. The augmentation engine 216 can receive the message and input the message data (e.g., text content, images, etc.) into a persona model loaded from persona database 212. In some implementations, augmentation engine 216 can augment the message data with profile data generated by profile builder 210. Alternatively, augmentation engine 216 may use the profile data directly during augmentation.

The persona model processes the message data and generates one or more action types and corresponding parameters. For example, given the message data of FIG. 1 (e.g., header 102 and body 104), augmentation engine 216 can input the message data into the persona model and receive a first action including an action type of "video search" with the parameter "photography" and a second action including an action type of "shopping" with parameters "thejungle.com" and "photography accessories." From these predicted next actions, augmentation engine 216 can instruct a data preparation stage 218 to generate corresponding augmented content items. If no actions are predictable, augmentation engine 216 can alternatively use a profile to generate higher-level actions (e.g., general links to photography-related resources).

Data preparation stage 218 receives the predicted next actions from augmentation engine 216 (via processing by a persona model) and generates one or more augmented content items. In some implementations, data preparation stage 218 can utilize a template library of various forms of augmented content items (some of which are depicted in FIG. 1) and can populate fields of such templates based on the action type and parameters. In some implementations, data preparation stage 218 can utilize a ranking or confidence of the predicted next actions to determine an ordering of corresponding augmented content items, as described previously.

Data preparation stage 218 provides the augmented content items to a UI generator 220 which can generate a complete UI that includes messages (from profile builder 210) and augmented content items (from data preparation stage 218). Client device 222 can be a mobile phone, laptop or desktop computer, or similar type of computing device. UI generator 220 can then provide the UI to a client device 222 (e.g., over a network connection). An example of such a UI is presented in FIG. 1 and those details are not repeated herein. In some implementations, UI generator 220 can be implemented on client device 222. For example, the UI generator 220 may only transmit the data representing the messages and augmented content items, and the final UI may be constructed locally on the client device 222 (e.g., via JAVASCRIPT® or native mobile application code).

Figure 3:
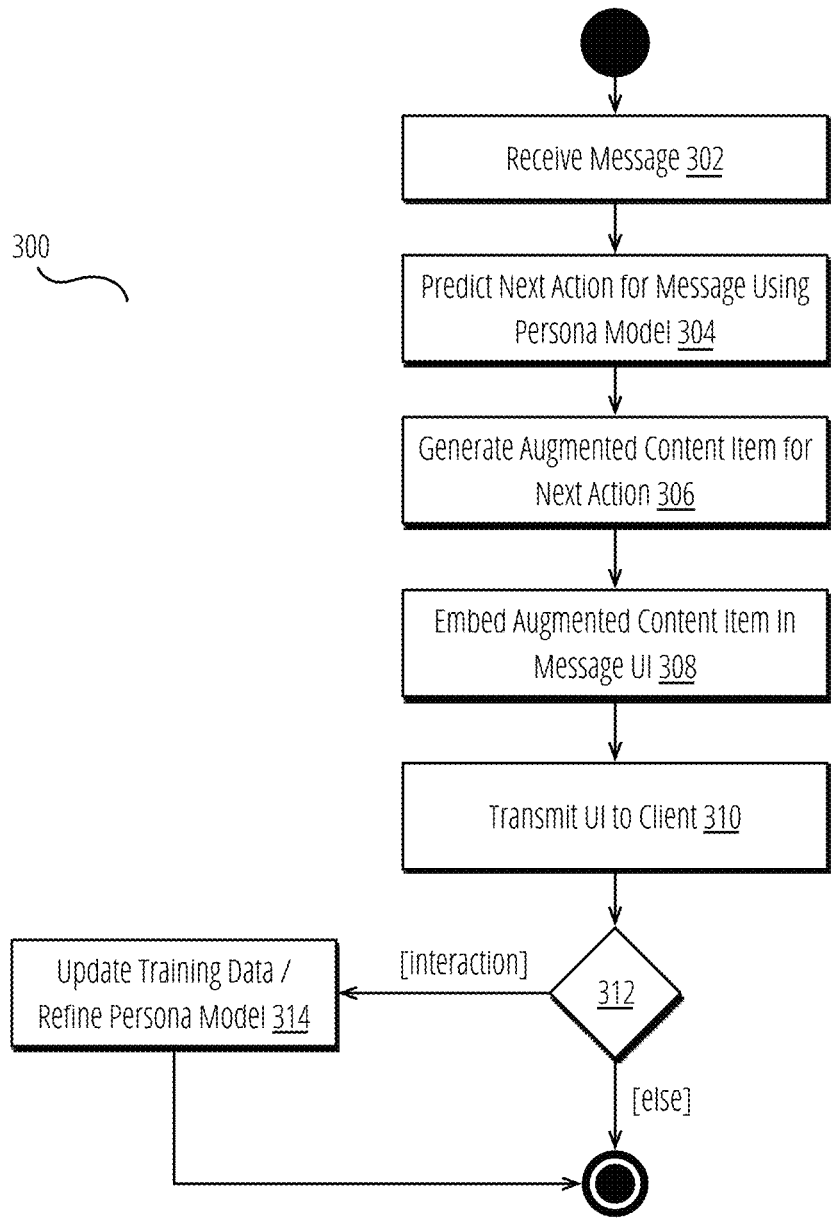
FIG. 3 is a flow diagram illustrating a method for generating and inserting augmented content items into a messaging interface.
Figure 4:
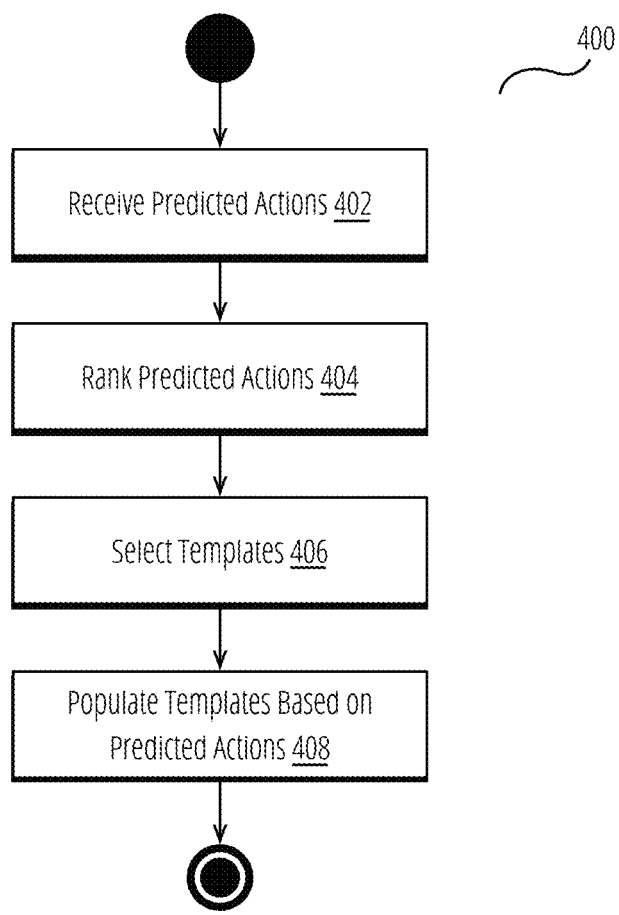
FIG. 4 is a flow diagram illustrating a method for generating augmented content items using a persona model.

Further details regarding using persona models to generate augmented content items are described more fully in the description of FIGS. 3 and 4 and are not repeated herein.

FIG. 3 is a flow diagram illustrating a method for generating and inserting augmented content items into a messaging interface.

In step 302, method 300 can include receiving a message. As discussed above, a message may be an email, text message, in-app message, chat message, instant message, social network message or generally any other type of message. The message can include message content or message data as well as metadata (e.g., header data). The message data may include content items (e.g., text, image, or video content). Method 300 may receive the message as part of receiving messages generally to implement a message service. In other scenarios, method 300 may receive a message in response to a user request (e.g., a client device requesting to view a message. In either scenario, a sender may send a message may to the user.

In step 304, method 300 can include predicting the next action the user will take in response to the message.

In general, step 304 includes predicting a next action of the user based on the message by inputting the content item into a predictive model trained using historical actions performed by the user. In one implementation, the predictive model comprises a neural network. In some implementations, the neural network can be an artificial neural network (ANN), deep neural network (DNN), recurrent neural network (RNN) such as a long-short term memory (LSTM) model, self-attention transformer-based model, random forest, or similar type of model. Certainly, other types of machine learning (ML) models may be used. In some implementations, a predictive model that processes time-series data (e.g., RNN or LSTM) may be used to capture temporal trends, however the disclosure is not limited as such. Indeed, in some implementations, the training data can be generated in the above manner such that each message-action pair can be analyzed independently.

The neural network can output an action type and one or more parameters associated with the action type as the next action. As one example, for a given message regarding the purchase of a mobile phone, the predictive model may output a first action having a type of "search" with parameters "mobile phone photography instructional videos" and a second action having a type of "shopping" with parameters "phone case." As will be discussed, these actions can be used to populate templates of augmented content items.

As discussed in more detail in FIG. 5, the predictive model may be trained by generating a training dataset for the user, the training dataset generated using historical messages and historical actions performed within a forecast window relative to the historical messages. Although a single "next action" is discussed in FIG. 3, method 300 may generate multiple such actions and method 300 can be applied to each predicted next action.

In step 306, method 300 can include generating an augmented content item.

In one implementation, method 300 can generate the augmented content item based on the next action predicted by the predictive model. In some implementations, the augmented content item can be a hyperlink, video, image, or text content item. In one implementation, method 300 can generate the augmented content item by identifying an external data source and generating an embedded module displaying data from the external data source. In one implementation, the embedded module is an accelerated mobile pages (AMP) module. Details regarding the generation of augmented content items are provided in more detail in FIG. 4 which are not repeated herein.

In step 308, method 300 can include embedding the augmented content item and the content item into a UI.

In one implementation, the UI can comprise a message viewing UI. In such implementations, the message viewing UI may include a pane for messages and a pane for augmented content items. In one implementation, embedding the augmented content item and the content item into a UI can include displaying the content item in a first pane of the UI and displaying the augmented content item alongside the first pane. As discussed in FIG. 1, method 300 may ultimately generate a UI (or provide data for a client to generate the UI) that includes both the message content (received in step 302) as well as the augmented content items generated in step 306.

In step 310, method 300 can include transmitting the UI to a client device of the user. In one implementation, method 300 can then provide the UI to a client device (e.g., over a network connection). An example of such a UI is presented in FIG. 1 and those details are not repeated herein. In some implementations, method 300 may only transmit the data representing the messages and augmented content items, and the final UI may be constructed locally on the client device (e.g., via JAVASCRIPT® or native mobile application code).

In step 312, method 300 can include determining if a user interacted with the UI. In some implementations, the UI can include event handlers to monitor for user interactions (e.g., mouse events, touch events, scroll events, open/close events, etc.) to determine how a user interacts with the UI. If no such interactions are detected, method 300 ends. However, if a user interaction is detected, method 300 proceeds to step 314.

In step 314, method 300 can include updating training data based on the interaction.

In some implementations, method 300 can monitor for interactions with an augmented content item (e.g., click, dwell, hover, or touch events). In response to such an event, method 300 can generate a training vector in response. The training vector can include the displayed message contents and an action derived from the interaction. In some implementations, method 300 can then add this training vector to the training dataset and re-train the persona model. In some implementations, this re-training can be continuously, thus continuously refining the model based on the most recent interactions of the user.

FIG. 4 is a flow diagram illustrating a method for generating augmented content items using a persona model.

In step 402, method 400 can include receiving one or more predicted actions. As discussed previously, these predicted actions can be the output of a trained predictive model (e.g., neural network) that represent both an action type and zero or more parameters associated with the action type. Two examples are used herein for the following discussion. In a first example, an action type of "shopping" is associated with a destination parameter ("thejungle.com") and a product parameter ("camera lens"). In a second example, an action type of "send message" is associated with a recipient parameter ("John Doe").

In step 404, method 400 can include optionally ranking the predicted actions.

In some implementations, each action can be associated with a confidence value. In general, the confidence value represents the likelihood that the prediction next action is accurate and is generated by the predictive model during inference. In an optional implementation, method 400 can rank the next actions based on this confidence and, in further optional implementations, can only select a subset of the highest-ranking next actions for presentation to the user. In some implementations, method 400 can first divide the next actions into categories (e.g., video and shopping vs. in-app commands) and then sort the actions within each category. In this manner, method 400 can provide the top actions on a per-category basis to ensure that each category can be represented.

In step 406, method 400 can include selecting one or more templates to generate augmented content items with.

In one implementation, method 400 can select a template for a given action based on the action type and/or parameters. For example, actions relating to watching videos or shopping may be associated with corresponding templates that include graphical objects while in-app messaging actions may only utilize icons and text (both are illustrated in FIG. 1).

In some implementations, method 400 can use the optional ranking to determine which template to use. For example, some actions (e.g., "shopping") can be associated with multiple template types. Some templates (e.g., graphical) may be reserved for higher confidence actions while other templates (e.g., icons or text) may be reserved for lower confidence actions. Thus, a higher confidence "shopping" action may be used with a higher complexity template (e.g., graphical) while a lower confidence "shopping" action may be associated with a lower complexity template (e.g., icons or text). Turning briefly to FIG. 1, hyperlink content item 110 corresponds to a higher complexity template while the "Buy Warranty" link in various text hyperlinks 112 corresponds to a lower complexity template.

In step 408, method 400 can include populating the templates based on the next action parameters. As discussed above, each next action may include zero or more parameters. These parameters, if present, can be used to populate a template.

As a first example, a shopping template can include a stock image that is populated with a search query included within the action parameters. Further, a uniform resource locator (URL) built for the vendor (e.g., "thejungle.com") and including the search query can be inserted into the shopping template, allowing the user to immediately perform a search of the vendor from withing the messaging UI.

As a second example, a video template may include a placeholder for a video URL. In one implementation, the next action may include a search string and method 400 can include searching a video service (e.g., website) using the search string and identifying a URL of the top video returned. Alternatively, method 400 can include using a template of a search query URL for the video service and generate the URL by inserting the search string into the search query URL. In either scenario, this generated URL can be inserted into the video template to generate the augmented content item.

As a third example, an in-app messaging template can include programmatic code for constructing a new message (using, for example, a compose interface). Method 400 can insert the recipient's contact details (e.g., name or email address) into the function call used to generate the new message, thus allowing for automatic addressing of messages within the messaging UI.

FIG. 5 is a flow diagram illustrating a method for building a persona model.

In step 502, method 500 can include selecting a message. In an implementation, the message can be read from a message datastore and can be associated with a user.

In step 504, method 500 can include identifying actions appearing withing a forecast window relative to the time of the message read in step 504. In some implementations, this time can be the time the message was sent, the time the message was received, the time the message was read or opened (or re-read or re-opened), the time the message was deleted, etc.

As discussed in FIG. 2, an action datastore can store timestamped actions performed by a user. In some implementations, method 500 can utilized a fixed time horizon (e.g., twenty-four hours after a message) as the period in which to identify any actions for the user in the time horizon. Alternatively, or in conjunction with the foregoing, method 500 can used a named entity recognition (NER) or similar natural language processing (NLP) process to identify keywords of the message and then perform a search on the action datastore using these keywords to identify later-occurring actions that match the keywords. For example, a message relating to the purchase of a mobile phone can yield the keyword "mobile phone" which can be used to search the user's action for any actions relating to the concept of a "mobile phone" occurring after the message.

In step 506, method 500 can include generating training vectors for a message.

In an implementation, the training vector can include an independent variable in the form of the message contents (and optionally headers). Each training vector can then be labeled with an action type and one or more parameters generated using the actions identified in step 504. In some implementations, each of these data points can be converted into an embedding representing using, for example, word2vec or similar types of embedding techniques to represent textual data as numeric sequences.

In step 508, method 500 can include determining if all messages of a user have been converted into training vectors. In some implementations, method 500 can process a batch of a user's messages (e.g., the most recent N messages) and need not process all messages at a time. If more messages remain, method 500 re-executes step 502 through step 506 until all messages have been converted.

In optional step 510, method 500 can include augmenting the training vectors with profile data. For example, profile data of the user can be added to each training vector (as input) along with message data to form a training dataset. Inclusion of profile data in the training data may aid classification as the predictive model will thus consider the user's profile when adjusting weights of the network.

In step 512, method 500 can include training a persona model.

As discussed, the persona model may be a neural network. In some implementations, the neural network can be an artificial neural network (ANN), deep neural network (DNN), recurrent neural network (RNN) such as a long-short term memory (LSTM) model, self-attention transformer-based model, random forest, or similar type of model. Certainly, other types of machine learning (ML) models may be used. In some implementations, a persona model that processes time-series data (e.g., RNN or LSTM) may be used to capture temporal trends, however the disclosure is not limited as such. Indeed, in some implementations, the training data can be generated in the above manner such that each message-action pair can be analyzed independently. Step 512 can include continuously updating the weights of the persona model according to preconfigured hyperparameters of the persona model. Specific details of training a predictive model are not limiting and are not disclosed in detail herein.

In step 514, method 500 can include determining if training of the persona model is completed. In some implementations, step 514 can include measuring the error of the persona training model when applied to a test data split (extracted from the training vectors described previously) and determining if the error is below a threshold. If the error is too high, method 500 re-trains the model in step 512. If the error is below the threshold, method 500 proceeds to step 516.

In step 516, method 500 can include storing the persona model. In an implementation, the resulting output of training is a set of weights or other types of parameters that represent the final state of the predictive model after training. Method 500 can write these weights or parameters to a persona database for later usage by a message platform, as described previously.

Figure 6:
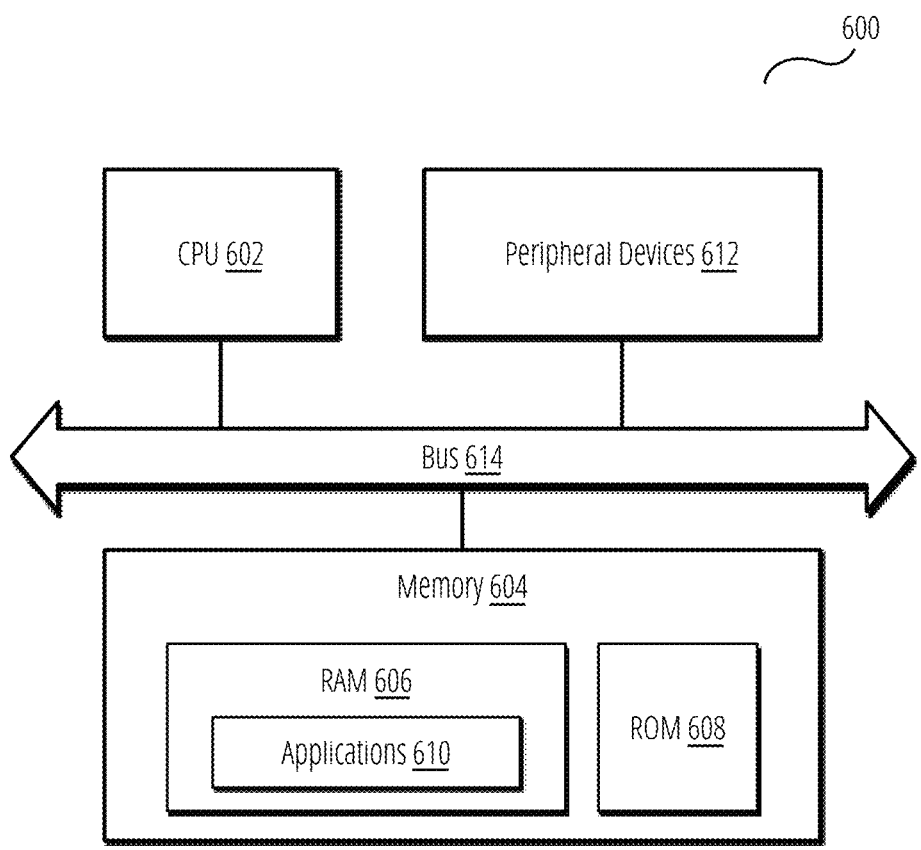
FIG. 6 is a block diagram of a computing device.

FIG. 6 is a block diagram of a computing device.

In some embodiments, the computing device 600 can be used to perform the methods described above or implement the components depicted in the foregoing figures.

As illustrated, the computing device 600 includes a processor or central processing unit (CPU) such as CPU 602 in communication with a memory 604 via a bus 614. The device also includes one or more input/output (I/O) or peripheral devices 612. Examples of peripheral devices include, but are not limited to, network interfaces, audio interfaces, display devices, keypads, mice, keyboard, touch screens, illuminators, haptic interfaces, global positioning system (GPS) receivers, cameras, or other optical, thermal, or electromagnetic sensors.

In some embodiments, the CPU 602 may comprise a general-purpose CPU. The CPU 602 may comprise a single-core or multiple-core CPU. The CPU 602 may comprise a system-on-a-chip (SoC) or a similar embedded system. In some embodiments, a graphics processing unit (GPU) may be used in place of, or in combination with, a CPU 602. Memory 604 may comprise a non-transitory memory system including a dynamic random-access memory (DRAM), static random-access memory (SRAM), Flash (e.g., NAND Flash), or combinations thereof. In one embodiment, bus 614 may comprise a Peripheral Component Interconnect Express (PCIe) bus. In some embodiments, bus 614 may comprise multiple busses instead of a single bus.

Memory 604 illustrates an example of non-transitory computer storage media for the storage of information such as computer-readable instructions, data structures, program modules, or other data. Memory 604 can store a basic input/output system (BIOS) in read-only memory (ROM), such as ROM 608, for controlling the low-level operation of the device. The memory can also store an operating system in random-access memory (RAM) for controlling the operation of the device Applications 610 may include computer-readable and computer-executable instructions which, when executed by the device, perform any of the methods (or portions of the methods) described previously in the description of the preceding Figures. In some embodiments, the software or programs implementing the method embodiments can be read from a hard disk drive (not illustrated) and temporarily stored in RAM 606 by CPU 602. CPU 602 may then read the software or data from RAM 606, process them, and store them in RAM 606 again.

The computing device 600 may optionally communicate with a base station (not shown) or directly with another computing device. One or more network interfaces in peripheral devices 612 are sometimes referred to as a transceiver, transceiving device, or network interface card (NIC).

An audio interface in peripheral devices 612 produces and receives audio signals such as the sound of a human voice. For example, an audio interface may be coupled to a speaker and microphone (not shown) to enable telecommunication with others or generate an audio acknowledgment for some action. Displays in peripheral devices 612 may comprise liquid crystal display (LCD), gas plasma, light-emitting diode (LED), or any other type of display device used with a computing device. A display may also include a touch-sensitive screen arranged to receive input from an object such as a stylus or a digit from a human hand.

A keypad in peripheral devices 612 may comprise any input device arranged to receive input from a user. An illuminator in peripheral devices 612 may provide a status indication or provide light. The device can also comprise an input/output interface in peripheral devices 612 for communication with external devices, using communication technologies, such as USB, infrared, Bluetooth™, or the like. A haptic interface in peripheral devices 612 provides tactile feedback to a user of the client device.

A GPS receiver in peripheral devices 612 can determine the physical coordinates of the device on the surface of the Earth, which typically outputs a location as latitude and longitude values. A GPS receiver can also employ other geo-positioning mechanisms, including, but not limited to, triangulation, assisted GPS (AGPS), E-OTD, CI, SAI, ETA, BSS, or the like, to further determine the physical location of the device on the surface of the Earth. In one embodiment, however, the device may communicate through other components, providing other information that may be employed to determine the physical location of the device, including, for example, a media access control (MAC) address, Internet Protocol (IP) address, or the like.

The device may include more or fewer components than those shown in FIG. 6, depending on the deployment or usage of the device. For example, a server computing device, such as a rack-mounted server, may not include audio interfaces, displays, keypads, illuminators, haptic interfaces, Global Positioning System (GPS) receivers, or cameras/sensors. Some devices may include additional components not shown, such as graphics processing unit (GPU) devices, cryptographic co-processors, artificial intelligence (AI) accelerators, or other peripheral devices.

The subject matter disclosed above may, however, be embodied in a variety of different forms and, therefore, covered or claimed subject matter is intended to be construed as not being limited to any example embodiments set forth herein; example embodiments are provided merely to be illustrative. Likewise, the claimed or covered subject matter is intended to be broadly interpreted. Among other things, for example, the subject matter may be embodied as methods, devices, components, or systems. Accordingly, embodiments may, for example, take the form of hardware, software, firmware, or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in an embodiment" as used herein does not necessarily refer to the same embodiment, and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms such as "or," "and," or "and/or," as used herein may include a variety of meanings that may depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms, such as "a," "an," or "the," again, can be understood to convey a singular usage or to convey a plural usage, depending at least in part upon context. In addition, the term "based on" may be understood as not necessarily intended to convey an exclusive set of factors and may, instead, allow for the existence of additional factors not necessarily expressly described, again, depending at least in part on context.

The present disclosure is described with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general-purpose computer to alter its function as detailed herein, a special purpose computer, application-specific integrated circuit (ASIC), or other programmable data processing apparatus, such that the instructions, which execute via the processor of the computer or other programmable data processing apparatus, implement the functions/acts specified in the block diagrams or operational block or blocks. In some alternate implementations, the functions or acts noted in the blocks can occur in any order other than those noted in the illustrations. For example, two blocks shown in succession can, in fact, be executed substantially concurrently, or the blocks can sometimes be executed in the reverse order, depending upon the functionality or acts involved.

These computer program instructions can be provided to a processor of a general-purpose computer to alter its function to a special purpose; a special purpose computer; ASIC; or other programmable digital data processing apparatus, such that the instructions, which execute via the processor of the computer or other programmable data processing apparatus, implement the functions or acts specified in the block diagrams or operational block or blocks, thereby transforming their functionality in accordance with embodiments herein.

For the purposes of this disclosure, a computer-readable medium (or computer-readable storage medium) stores computer data, which data can include computer program code or instructions that are executable by a computer, in machine-readable form. By way of example, and not limitation, a computer-readable medium may comprise computer-readable storage media for tangible or fixed storage of data or communication media for transient interpretation of code-containing signals. Computer-readable storage media, as used herein, refers to physical or tangible storage (as opposed to signals) and includes without limitation volatile and non-volatile, removable, and non-removable media implemented in any method or technology for the tangible storage of information such as computer-readable instructions, data structures, program modules or other data. Computer-readable storage media includes, but is not limited to, RAM, ROM, EPROM, EEPROM, flash memory or other solid-state memory technology, CD-ROM, DVD, or other optical storage, magnetic cassettes, magnetic tape, magnetic disk storage, or other magnetic storage devices, or any other physical or material medium which can be used to tangibly store the desired information or data or instructions and which can be accessed by a computer or processor.

For the purposes of this disclosure, a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer-readable medium for execution by a processor. Modules may be integral to one or more servers or be loaded and executed by one or more servers. One or more modules may be grouped into an engine or an application.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than or more than all the features described herein are possible.

Functionality may also be, in whole or in part, distributed among multiple components, in manners now known or to become known. Thus, a myriad of software, hardware, and firmware combinations are possible in achieving the functions, features, interfaces, and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example to provide a complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

We claim:

1. A method comprising:

receiving, at a processor, a message from a sender to a user over a network, the message including a content item;

predicting, by the processor, a next action of the user based on the message by inputting the content item into a predictive model trained using historical user interface interactions performed by the user within a same user interface context as the predicted next action, the predictive model comprising a neural network and the next action comprising a data structure representing a user interaction performed with respect to a user interface (UI), the data structure including a type of action and one or more parameters defining the action;

selecting, by the processor, a template from a plurality of templates, each mapped to a respective action type based on the type of the next action;

generating, by the processor, an augmented content item using the selected template, the augmented content item including a control to perform the next action, the augmented content item generated by inserting the one or more parameters into respective placeholders within the selected template;

adding, by the processor, the augmented content item and the content item into respective sections of the UI in accordance with a predefined layout;

transmitting, by the processor, the UI to a client device of the user;

monitoring, by the processor, user interactions with the augmented content item in the UI; and upon detecting a user interaction with the augmented content item: generating a new training vector comprising the content item of the received message and an action derived from the detected user interaction and updating the predictive model by retraining the neural network using the new training vector to refine prediction of next actions.

2. The method of claim 1, wherein receiving a message from a sender to a user comprises receiving an email from the sender and wherein the content item includes one of text, image, or video content.

3. The method of claim 1, further comprising training the neural network by generating a training dataset for the user, the training dataset generated using historical messages and historical actions performed within a forecast window relative to the historical messages.

4. The method of claim 1, wherein the neural network outputs an action type and one or more parameters associated with the action type as the next action.

5. The method of claim 1, wherein generating the augmented content item comprises identifying an external data source and generating an embedded module displaying data from the external data source.

6. The method of claim 5, wherein the embedded module comprises an accelerated mobile pages (AMP) module.

7. The method of claim 1, wherein adding the augmented content item and the content item into a UI comprises displaying the content item in a first pane of the UI and displaying the augmented content item alongside the first pane.

8. The method of claim 1, wherein the augmented content item comprises one of a hyperlink, video, image, or text.

9. A non-transitory computer-readable storage medium for tangibly storing computer program instructions capable of being executed by a computer processor, the computer program instructions defining steps of:
receiving a message from a sender to a user over a network, the message including a content item;
predicting a next action of the user based on the message by inputting the content item into a predictive model trained using historical user interface interactions performed by the user within a same user interface context as the predicted next action, the predictive model comprising a neural network and the next action comprising a data structure representing a user interaction performed with respect to a user interface (UI), the data structure including a type of action and one or more parameters defining the action;
selecting, by the processor, a template from a plurality of templates, each mapped to a respective action type based on the type of the next action;
generating an augmented content item using the template, the augmented content item including a control to perform the next action, the augmented content item generated by inserting the one or more parameters into respective placeholders within the selected template;
adding the augmented content item and the content item into respective sections of the UI in accordance with a predefined layout;
transmitting the UI to a client device of the user;
monitoring user interactions with the augmented content item in the UI; and
upon detecting a user interaction with the augmented content item: generating a new training vector comprising the content item of the received message and an action derived from the detected user interaction and updating the predictive model by retraining the neural network using the new training vector to refine prediction of next actions.

10. The non-transitory computer-readable storage medium of claim 9, the steps further comprising training the neural network by generating a training dataset for the user, the training dataset generated using historical messages and historical actions performed within a forecast window relative to the historical messages.

11. The non-transitory computer-readable storage medium of claim 9, wherein the neural network outputs an action type and one or more parameters associated with the action type as the next action.

12. The non-transitory computer-readable storage medium of claim 9, wherein generating the augmented content item comprises identifying an external data source and generating an embedded module displaying data from the external data source.

13. The non-transitory computer-readable storage medium of claim 12, wherein the augmented content item comprises one of a hyperlink, video, image, or text.

14. A device comprising:
a processor; and
a storage medium for tangibly storing thereon logic for execution by the processor, the logic comprising instructions for:
receiving a message from a sender to a user over a network, the message including a content item;
predicting a next action of the user based on the message by inputting the content item into a predictive model trained using historical user interface interactions performed by the user within a same user interface context as the predicted next action, the predictive model comprising a neural network and the next action comprising a data structure representing a user interaction performed with respect to a user interface (UI), the data structure including a type of action and one or more parameters defining the action;
selecting, by the processor, a template from a plurality of templates, each mapped to a respective action type based on the type of the next action;
generating an augmented content item using the selected template, the augmented content item including a control to perform the next action, the augmented content item generated by inserting the one or more parameters into respective placeholders within the selected template;
adding the augmented content item and the content item into respective sections of the UI in accordance with a predefined layout;
transmitting the UI to a client device of the user;
monitoring user interactions with the augmented content item in the UI; and
upon detecting a user interaction with the augmented content item: generating a new training vector comprising the content item of the received message and an action derived from the detected user interaction and updating the predictive model by retraining the neural network using the new training vector to refine prediction of next actions.

15. The device of claim 14, the instructions further comprising training the neural network by generating a training dataset for the user, the training dataset generated using historical messages and historical actions performed within a forecast window relative to the historical messages.

16. The device of claim 14, wherein the neural network outputs an action type and one or more parameters associated with the action type as the next action.

17. The device of claim 14, wherein generating the augmented content item comprises identifying an external data source and generating an embedded module displaying data from the external data source.

* * * * *